April 29, 1952     H. E. COX     2,594,401
NUTCRACKER
Filed March 10, 1950     2 SHEETS—SHEET 1
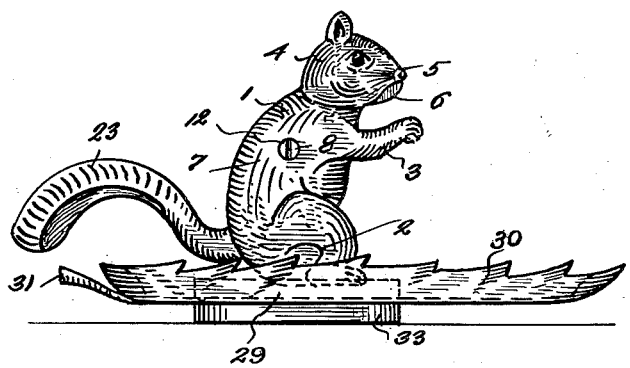
Fig. 1.
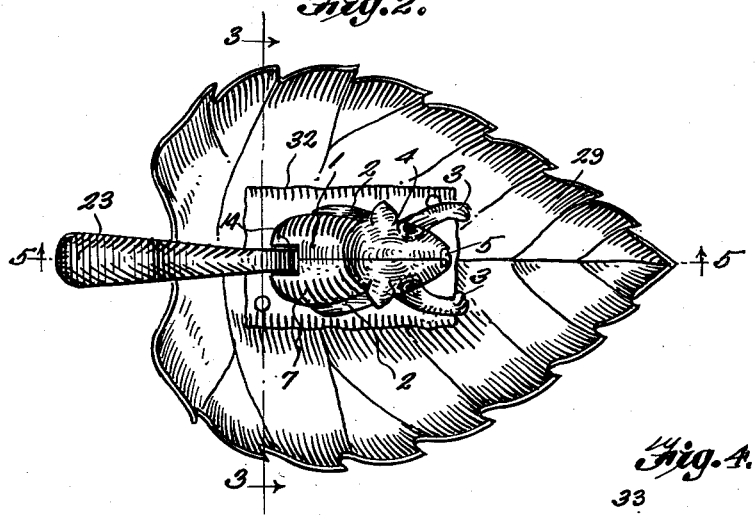
Fig. 2.
Fig. 3.
Fig. 4.
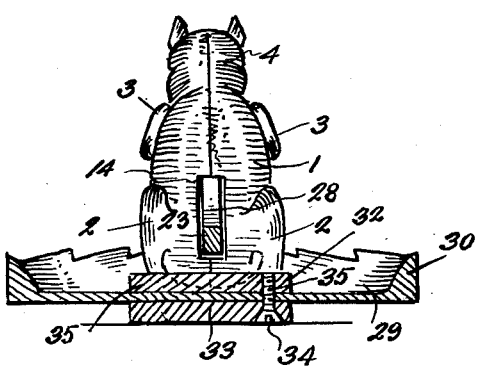
INVENTOR.
HERMAN E. COX
BY
ATTY.

April 29, 1952 H. E. COX 2,594,401
NUTCRACKER

Filed March 10, 1950 2 SHEETS—SHEET 2

INVENTOR.
HERMAN E. COX
BY
ATTY.

Patented Apr. 29, 1952

2,594,401

UNITED STATES PATENT OFFICE 2,594,401

NUTCRACKER

Herman E. Cox, Norfolk, Va.

Application March 10, 1950, Serial No. 148,770

2 Claims. (Cl. 146—14)

This invention relates to a nut cracker and it is one object of the invention to provide a nut cracker of such construction that it has the appearance of a squirrel sitting upright upon a leaf in position to eat a nut held in its front paws, the leaf constituting a tray for catching nut shells and meats when nuts are cracked.

Another object of the invention is to provide a nut cracker wherein the body which represents a squirrel is secured in a sitting position upon the leaf or tray that it will be firmly secured and the major portion of the under face of the tray held in upwardly spaced relation to the surface of a table upon which a block at the center of the tray rests.

Another object of the invention is to provide the nut cracker with a hollow body formed of side sections secured together and having a head at its upper end conforming to the appearance of the head of a squirrel and including a lower jaw which is shiftable towards and away from the upper jaw and moves vertically between front legs of the squirrel so that a nut supported upon the front legs will be carried upwardly and gripped between the jaws and cracked as the lower jaw moves upwardly.

Another object of the invention is to provide the lower movable jaw with a downwardly extending shank toothed to form a rack bar which is disposed within the hollow body and meshing with teeth of a pinion formed about the pivoted end of a lever having a portion projecting rearwardly from the body and having the appearance of a squirrel's tail.

Another object of the invention is to so mount the shank and the jaw carried thereby that the shank and the movable jaw will be guided during vertical movement of the movement of the lower jaw towards and away from the upper jaw and binding of the shank or rack bar prevented.

Another object of the invention is to provide a nut cracker which is attractive in appearance, efficient in operation, and capable of being manufactured at low cost and its parts easily and quickly assembled.

The invention is illustrated in the accompanying drawings wherein:

Fig. 1 is a side elevation of the nut cracker.

Fig. 2 is a top plan view thereof.

Fig. 3 is a vertical sectional view taken transversely through the nut cracker along the line 3—3 of Figure 2.

Fig. 4 is a fragmentary view looking at the bottom of the tray.

Figure 5:
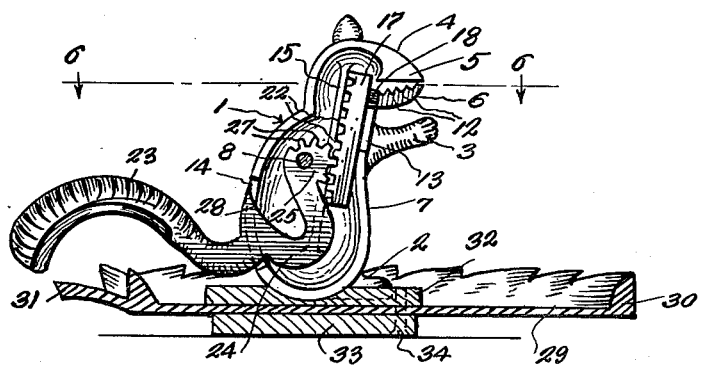
Fig. 5 is a vertical sectional view taken longitudinally of the nut cracker along the line 5—5 of Figure 2.
Figure 6:
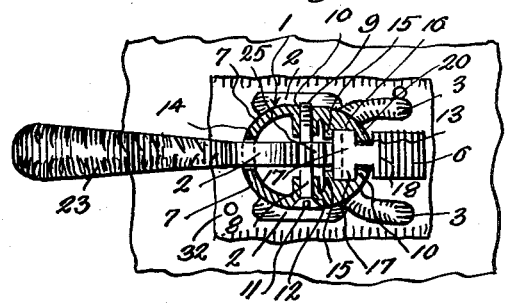
Fig. 6 is a sectional view taken along the line 6—6 of Figure 5.

This improved nut cracker has a body 1 which is shaped to represent a squirrel sitting upright upon its rear legs 2 and having its front legs 3 projecting forwardly in substantially the position in which a squirrel holds its front legs while holding a nut N which it is about to crack and eat. The head 4 is of the proper size and shape of a squirrel's head and has an upper jaw 5 and a lower jaw 6, the upper jaw being thickened inwardly of the head to impart added strength thereto and also provide a wide and elongated under surface for this jaw so that it may have ample contacting engagement with a nut to be cracked.

The body which is hollow, is formed of two side sections which are of duplicate formation and have smooth edge faces disposed in face to face contact with each other and so held when a screw or pin 8 is passed through the body transversely thereof and its reduced and threaded end portion 9 screwed tightly into a threaded opening 10 formed in one side section of the body. The other end of the screw or pin has a head 11 which fits into and is countersunk in an opening 12 formed in the other side section of the body. Front edges of the two sections are formed with recesses which register and provide the body with a front slot 13 extending vertically from the upper jaw to front legs 3 and lower portions of the rear edges of the two sections are formed with similar recesses which register and provide the body with a rear slot 14. The portion of the body through which the front opening or slot is formed is straight vertically and in rearwardly spaced relation to this slot the side sections of the body are formed with inwardly projecting ribs 15 forming rear walls of a track or channel 16.

Figure 8:
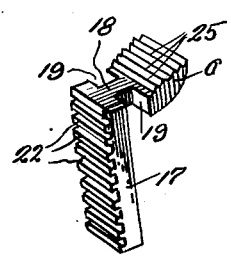
Fig. 8 is a perspective view of the lower jaw and its shank or rack bar.

The lower jaw 6 is formed as shown in Figure 8, and referring to this figure it will be seen that the jaw is carried by a vertically disposed shank or rack bar 17 with which it is connected by a narrow neck 18. This neck passes through the front slot 13, and as it is of appreciably less width than the jaw and the rack bar and is located midway the width thereof it defines recesses 19 into which fit the edge portions 20 of the two sections 7 along opposite sides of the front slot 13. Therefore when the movable lower jaw is applied to the body its shank or rack bar will be disposed vertically in the track 16 and has side edge portions of its rear surface overlapped by the ribs 15 which guide vertical sliding movement of the rack bar. The upper surface of the movable jaw is framed with gripping teeth 21 which will firmly grip a nut and prevent it from slipping from between the movable jaw and the stationary jaw during a nut cracking operation and the rear surface of the rack bar is formed with transversely extending rack teeth 22.

Figure 7:
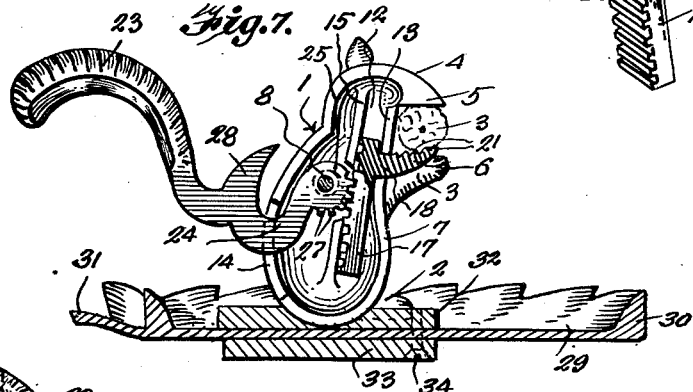
Fig. 7 is a view similar to Figure 5 showing the lower jaw in position to grip and crack a nut.
Figure 9:
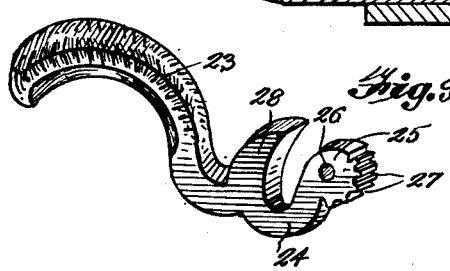
Fig. 9 is a perspective view of the lever by means of which the lower jaw and its rack bar are shifted vertically.

In order to move the movable jaw towards and away from the stationary jaw there has been provided a lever 23 which is curved longitudinally and resembles the tail of a squirrel. This lever has a J-shaped shank 24 which passes through the rear slot 14 and upwardly within the hollow body 1 and at its upper end is formed with a pinion 25. The screw or pin 8 passes through a circular opening 26 formed centrally of the pinion 25 and the teeth 27 of the pinion mesh with the teeth of the rack bar 17. Therefore when the lever is grasped and swung upwardly to a raised position the movable jaw 6 will be shifted downwardly between the front legs 3 to a position in which a nut may be set at rest upon the legs and gripped between the two jaws as the weight of the lever swings the lever downwardly towards its initial position and the pinion moves the lower jaw upwardly to the position shown in Figure 7. Continued downward movement of the lever by pressure applied thereto causes the lower jaw to apply cracking force upon the nut, and after the nut has been cracked the lever may be swung upwardly a sufficient distance to release the cracked nut and allow removal thereof from between the jaws by a person operating the nut cracker. When the lever is in the lowered position it is desirable to conceal the rear slot 14, and in order to do so there has been provided a curved tongue 28 which tapers upwardly to its upper end and is spaced rearwardly from the shank 24 a sufficient distance to cause its upper end to move upwardly in overlapping relation to the back of the body above the upper end of the slot 14 when the lever is swung upwardly to a raised position. By so forming the tongue 28 it will serve to substantially conceal the slot 14 when the lever is in its normally lowered position, shown in Figure 5, but it will not interfere with upward movement of the lever to its raised position.

In order to catch broken nut shells and nut meats which may drop when the lower jaw is moved downwardly after cracking a nut there has been provided a tray 29 which is shaped to represent a tree leaf and has its marginal portions thickened upwardly to form a rim 30. There has also been provided a portion 31 representing a short stem for the leaf. The body rests upright upon the central portion of the tray and is formed with a base 32 consisting of companion plates extending laterally and forwardly and rearwardly from lower ends of the two side sections 7 of the body. These plates are flat and form a base of oblong shape and of such length and width that the base serves as a good support for the body. The base rests flat upon the central portion of the tray in face to face engagement therewith and directly under this base is disposed a flat block 33 which is of the same dimensions as the base and is formed of wood, or other material sufficiently soft to prevent it from scratching a table upon which the nut cracker is set when in use. Screws 34 pass through registering openings formed in the block and the tray and have their upper portions screwed into threaded sockets 35 formed in corner portions of the base. The screws hold both the base and the block firmly against the tray and as their heads are countersunk in the block they will not scratch a table surface. The block holds the major portion of the tray in upwardly spaced relation to the table top and thus very effectively prevents the under surface of the tray from scratching the table.

Having thus described the invention, what is claimed is:

1. A nut cracker comprising a hollow vertical body consisting of side sections and having a head at its upper end formed with a solid forwardly projecting portion constituting a stationary upper jaw, legs extending forwardly from the side sections below said head and constituting transversely spaced nut-supporting members, a fastener passing transversely through said body and holding the sections together, a solid lower jaw under said upper jaw shiftable vertically and having a neck at its rear end extending into the body through a vertically extending slot at the front thereof and having its inner end integral with the upper end of a rack bar extending vertically in the body between guide ribs carried by the side sections of the body, an operating lever for the movable jaw extending into the body through a vertical slot formed in the lower portion of the back thereof, the inner end of said lever being rotatably mounted about said fastener and meshing with the rack bar to shift the movable jaw vertically between said legs towards and away from the stationary jaw.

2. A nut cracker comprising a hollow vertically disposed body consisting of side sections secured together and having an upper front slot and a lower rear slot, a stationary jaw extending forwardly above the front slot, a lower jaw under said stationary jaw shiftable vertically in the front slot and provided with a downwardly extending rack bar in the body, legs extending forwardly from the body at opposite sides of the front slot in transverse spaced relation to each other and constituting members adapted to initially support a nut and between which the movable jaw moves vertically towards and away from the stationary jaw, and a lever extending through the rear slot and having at its inner end a pinion rotatably mounted and meshing with said rack bar.

HERMAN E. COX.

REFERENCES CITED

The following references are of record in the file of this patent:

UNITED STATES PATENTS

| Number | Name | Date |
| --- | --- | --- |
| 54,566 | Lyon | May 8, 1866 |
| 55,177 | Tilden | May 29, 1866 |
| 204,225 | Humphrey | May 28, 1878 |
| 660,806 | Tombs | Oct. 30, 1900 |
| 707,997 | Wickstrom | Aug. 26, 1902 |
| 1,176,639 | Bagby | Mar. 21, 1916 |
| 1,242,436 | Greenhaw | Oct. 9, 1917 |